(No Model.)
J. STEPHENSON.
CAR BRAKE.
No. 303,892. Patented Aug. 19, 1884.
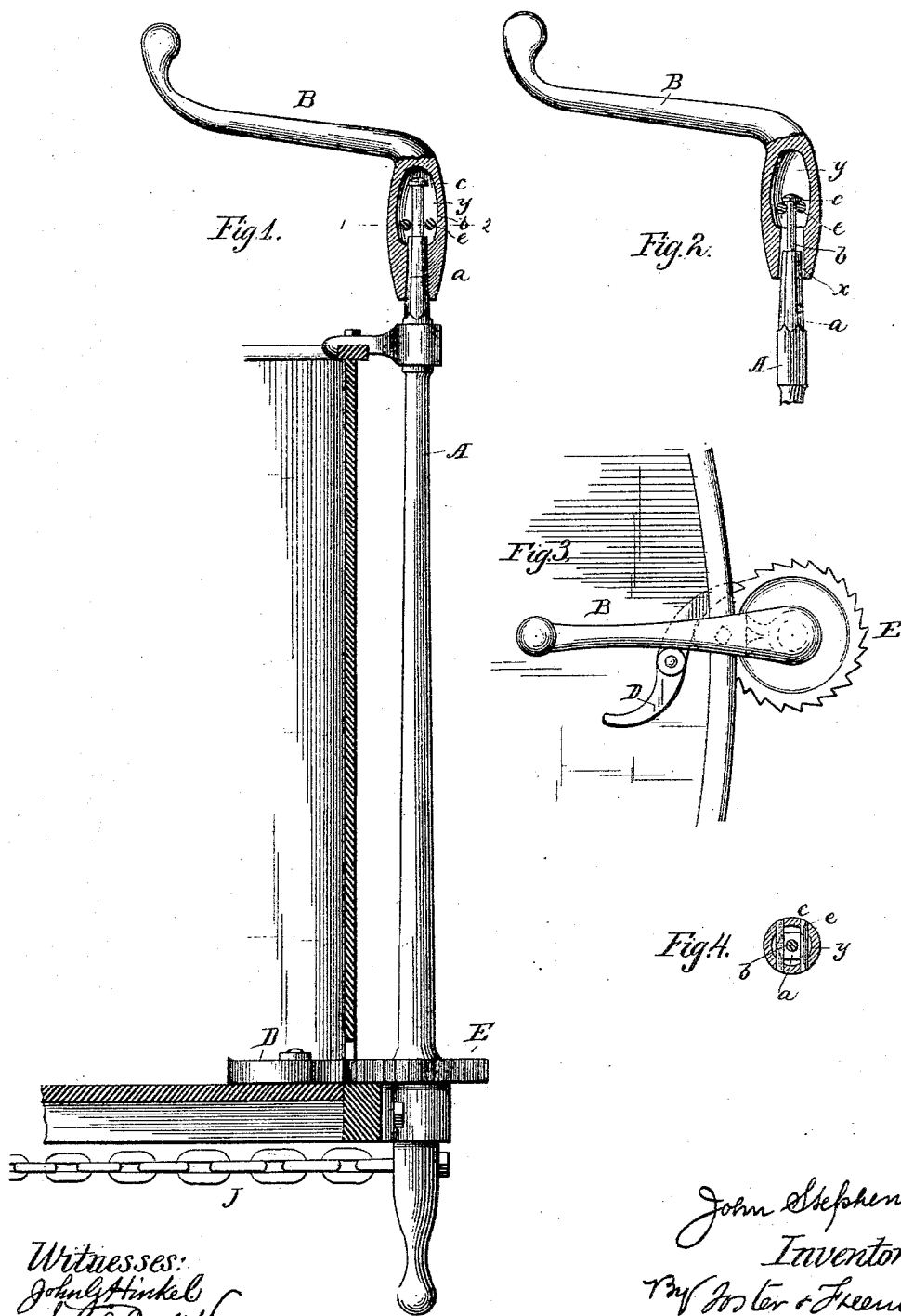

UNITED STATES PATENT OFFICE.

JOHN STEPHENSON, OF NEW YORK, N. Y.

CAR-BRAKE.

SPECIFICATION forming part of Letters Patent No. 303,892, dated August 19, 1884.

Application filed June 11, 1884. (No model.)

*To all whom it may concern:*

Be it known that I, JOHN STEPHENSON, a citizen of the United States, and a resident of the city, county, and State of New York, have invented certain new and useful Improvements in Car-Brakes, of which the following is a specification.

My invention relates to the operating devices for adjusting the brakes of street-cars; and it consists in connecting the handle and shaft in such manner as to permit the handle to be set upon and locked to the shaft at any desired angle without necessarily disconnecting it therefrom.

My invention also consists in tapering that portion of the shaft upon which the chain is wound, and also the end of the chain, so that the latter may be rapidly wound without any loss of power in applying the brakes.

In the drawings, Figure 1 is a sectional elevation showing my improved brake devices as applied to the platform of a street-car. Fig. 2 is a detached sectional view showing the handle in a different position. Fig. 3 is a plan view of Fig. 1. Fig. 4 is a section on the line 1 2, Fig. 1.

In street-cars, especially in those of large size, it is most desirable to secure a powerful brake action, and at the same time permit the brakes to be quickly applied, which necessitates a maximum force upon the brake devices with a minimum motion of the operating-handle of the brake-shaft. It has heretofore been found difficult to secure such an action upon the brakes, because of the change in the position of the brake-shoes, usually hung to the body of the car, in consequence of the varying load upon the car, necessitating the suspension of the brake shoes or clogs remote from the wheels, and a consequent greater length of movement of the brake-chain to bring them against the wheels, and a more extended movement of the brake-handle with an increased expenditure of time and labor. Another difficulty of securing a powerful pressure upon the brakes results sometimes from the position of the handle of the brake-shaft at the time when the greatest force should be exerted, the handle at such times extending almost directly toward the driver, instead of being about parallel to the dash-board, as is requisite in order to operate most effectively. Another difficulty in applying the requisite pressure without the loss of too much time results from the small diameter of the windle or lower end of the brake-shaft, which causes the brake-chain to be wound slowly, while any increase in the diameter securing a more rapid action is accompanied by a loss of power. To avoid these difficulties I provide the brake-shaft with an adjustable but undetachable handle, which can readily be set at any required angle to the shaft and then connected so as not to turn thereon, and by so constructing the windle and brake-chain as to secure the rapid winding of the latter without loss of power in applying the brakes. The handle may be connected to the shaft in different ways so as to effect the desired result. In Figs. 1 and 2 the shaft A is shown as provided with an angular or polygonal head, $a$, from which extends a stem $b$, terminating in a knob, $c$; and the handle B is provided with a socket, $x$, adapted to the angular head $a$, and with a recess, $y$, above the socket, and with one or more keys or cross-bars, $e$, extending across the recess $y$, close to the stem $b$, as shown. This construction permits the handle to be set upon the angular portion of the shaft, as shown in Fig. 1, when the two are locked immovably together so long as pressure is applied to simply turn the handle; but the latter may be raised vertically until the key strikes the knob $c$, when the handle may be turned to any desired angle in respect to the dash-board and again depressed and locked to the shaft. This permits the driver at any time to place the handle in position for him to exert his power most effectively. For instance, if the handle is in the position shown in Fig. 3 at the time that the chain has become taut, when it is desirable to apply a greater force upon it the driver secures the shaft in position by engaging the foot-pawl D with the ratchet E, and then lifts the handle and turns it to the position shown in dotted lines, Fig. 3, and then locks it to the shaft, when he can draw it toward him so as to secure a powerful pressure upon the brakes. While the handle is thus readily adjustable, the keys serve to confine it to the shaft, so that it cannot be detached therefrom or lost or slip in the act of locking it to the shaft.

It will of course be evident that the connections between the handle and the shaft to secure the above-described result may be effected in different ways. Instead of making the lower end or windle of the shaft of uniform diameter, I taper it from the point where it is connected to the chain J, which, instead of being of the same size throughout, as usual, is heavier or larger near its point of connection with the windle. As the result of this construction a greater amount of chain is wound upon the enlarged portion of the shaft than would result if the latter were smaller or the chain not so thick, while as the windle is smaller toward that portion upon which the smallest portion of the chain is wound as the brakes are applied, as great a pressure upon the brakes is secured as would result if the entire windle were no thicker than its smallest diameter. I thus secure a rapid application of the brakes without any loss of power in applying them.

Without limiting myself to the precise construction and arrangement of parts shown, I claim—

1. A car-brake shaft provided with a handle connected to slide thereon to a limited extent, and adapted to positively lock with the shaft when in one position and to turn freely and independently on the shaft when in the other position, substantially as set forth.

2. The combination, with a car-brake shaft, of a handle sliding thereon, with shoulders upon the handle and shaft arranged to positively interlock when the handle is at the limit of its lowest motion, and to allow it to turn freely when in its upper position, substantially as specified.

3. A car-brake shaft angular at its upper end, and provided with a handle having a limited sliding motion upon the shaft, and adapted to positively engage with the angular portion of the latter when at the limit of its lowest motion, substantially as set forth.

4. The car-brake handle having a polygonal socket at the lower end, and an enlarged chamber above the socket, and a key crossing the said chamber, substantially as and for the purpose set forth.

5. The combination of the car-brake shaft having an angular portion and a headed stem at the upper end, and a handle having a socket adapted to said angular portion, a chamber to receive the said stem, and a key confining the handle to the shaft without interfering with its limited vertical movement, substantially as set forth.

6. A car-brake shaft provided with a tapering windle connected at its largest portion with a brake-chain which is thickest at the end nearest the windle, substantially as and for the purpose set forth.

7. The combination, with a car-brake, of a brake-chain of increased diameter at the end nearest the windle, and a brake-shaft of increased diameter at the point where it is connected to the end of the chain, substantially as set forth.

8. A car-brake shaft having a tapering windle connected at its largest part to a brake-chain largest in diameter at the end nearest the windle, and with a handle capable of a limited vertical movement on the shaft, and constructed to lock with the latter only when in its lowest position, substantially as set forth.

In testimony whereof I have signed my name to this specification in the presence of two subscribing witnesses.

JOHN STEPHENSON.

Witnesses:
STUART A. STEPHENSON,
JOS. B. STEPHENSON.